United States Patent
Hao et al.

(10) Patent No.: US 7,338,448 B2
(45) Date of Patent: Mar. 4, 2008

(54) METHOD AND APPARATUS FOR ULTRASOUND COMPOUND IMAGING WITH COMBINED FUNDAMENTAL AND HARMONIC SIGNALS

(75) Inventors: Xiaohui Hao, Waukesha, WI (US); Feng Lin, Waukesha, WI (US); Richard Yung Chiao, Menomonee Falls, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 68 days.

(21) Appl. No.: 10/703,903

(22) Filed: Nov. 7, 2003

(65) Prior Publication Data

US 2005/0101865 A1     May 12, 2005

(51) Int. Cl.
 *A61B 8/00*     (2006.01)
(52) U.S. Cl. ..................................... 600/443
(58) Field of Classification Search ........ 600/443–447, 600/456–458; 128/916; 73/625–626
See application file for complete search history.

(56) References Cited

U.S. PATENT DOCUMENTS

| | | | |
|---|---|---|---|
| RE35,148 E * | 1/1996 | Lizzi et al. ............... 348/163 |
| 5,653,235 A * | 8/1997 | Teo ............................ 600/447 |
| 5,984,869 A | 11/1999 | Chiao et al. | |
| 6,048,316 A * | 4/2000 | Zhao et al. ................. 600/447 |
| 6,095,977 A | 8/2000 | Hall et al. | |
| 6,113,545 A | 9/2000 | Chiao et al. | |
| 6,146,328 A | 11/2000 | Chiao et al. | |
| 6,210,328 B1 * | 4/2001 | Robinson et al. .......... 600/437 |
| 6,238,345 B1 * | 5/2001 | Wissler et al. ............. 600/443 |
| 6,312,384 B1 | 11/2001 | Chiao | |
| 6,390,980 B1 * | 5/2002 | Peterson et al. ........... 600/443 |
| 6,487,433 B2 | 11/2002 | Chiao | |
| 6,491,631 B2 | 12/2002 | Chiao et al. | |
| 6,508,770 B1 * | 1/2003 | Cai ............................. 600/447 |
| 6,511,426 B1 * | 1/2003 | Hossack et al. ........... 600/437 |
| 6,524,247 B2 * | 2/2003 | Zhao et al. ................. 600/437 |
| 6,544,177 B1 * | 4/2003 | Robinson ................... 600/443 |
| 6,547,732 B2 * | 4/2003 | Jago ............................ 600/437 |
| 6,554,770 B1 * | 4/2003 | Sumanaweera et al. .... 600/443 |
| 6,733,453 B2 * | 5/2004 | Freiburger et al. ......... 600/447 |
| 6,790,181 B2 * | 9/2004 | Cai et al. .................... 600/443 |
| 6,911,008 B2 * | 6/2005 | Pelissier et al. ............ 600/443 |

\* cited by examiner

OTHER PUBLICATIONS

Soren K. Jespersen et al. "Multi-Angle Compound Imaging," Ultrasonic Imaging 20, pp. 81-102 (1998).

*Primary Examiner*—Francis J. Jaworski
(74) *Attorney, Agent, or Firm*—McAndrews, Held & Malloy, Ltd.; Peter J. Vogel; Michael A. Dellapenna

(57) ABSTRACT

Certain embodiments include a system and method for improved compound imaging using a plurality of imaging modes. In an embodiment, a plurality of echo signals are received in response to a plurality of beams formed based on different imaging modes corresponding to different steering angles, such as steered or non-steered angles. The plurality of echo signals is compounded to form a compound image. In an embodiment, the imaging mode includes at least one of harmonic, fundamental, coded harmonic, and variable frequency imaging. Parameters may be generated for the plurality of beams formed based on different imaging modes corresponding to different steering angles. Additionally, the parameters may be stored. The echo signals may be filtered. Imaging mode may be controlled based on steering angle. Employing different imaging modes based on steering angles for spatial compound imaging helps reduce grating lobe artifacts while improving speckle reduction effect.

23 Claims, 6 Drawing Sheets

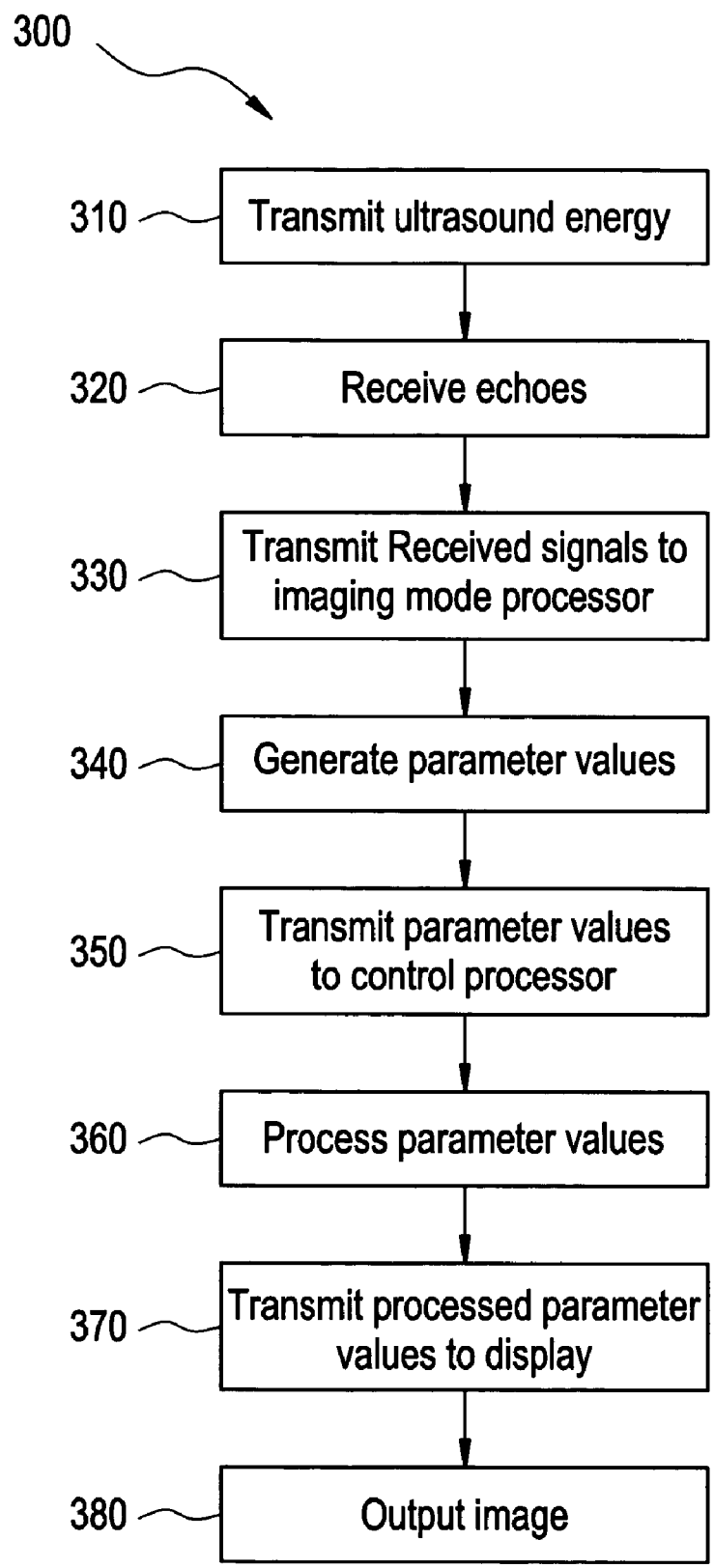

FIG. 4

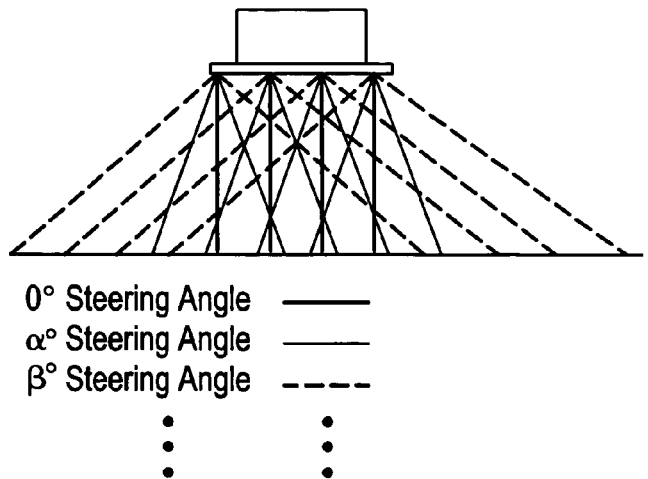

0° Steering Angle ———
α° Steering Angle ———
β° Steering Angle – – – –

FIG. 5

| | | | | | |
|---|---|---|---|---|---|
| High Frequency Fundamental Imaging | 0° | High Frequency Fundamental Imaging | 0° | High Frequency Fundamental Imaging | 0° |
| Harmonic Imaging (Single Firing or double firing) | α° | Ultra-Coded Tissue Harmonic Imaging | α° | Lower Frequency Fundamental Imaging | α° |
| Harmonic Imaging (Single Firing or double firing) | β° | Ultra-Coded Tissue Harmonic Imaging | β° | Harmonic Imaging (Single Firing, Phase Inversion, Ultra-Wideband, etc) | β° |

FIG. 6

| | | | |
|---|---|---|---|
| New Frequency Compounding | 0° | High Frequency Fundamental Imaging | 0° |
| New Frequency Compounding | α° | Harmonic Imaging | α° |
| New Frequency Compounding | β° | Lower Frequency Fundamental Imaging | β° |
| | | Harmonic Imaging | γ° |

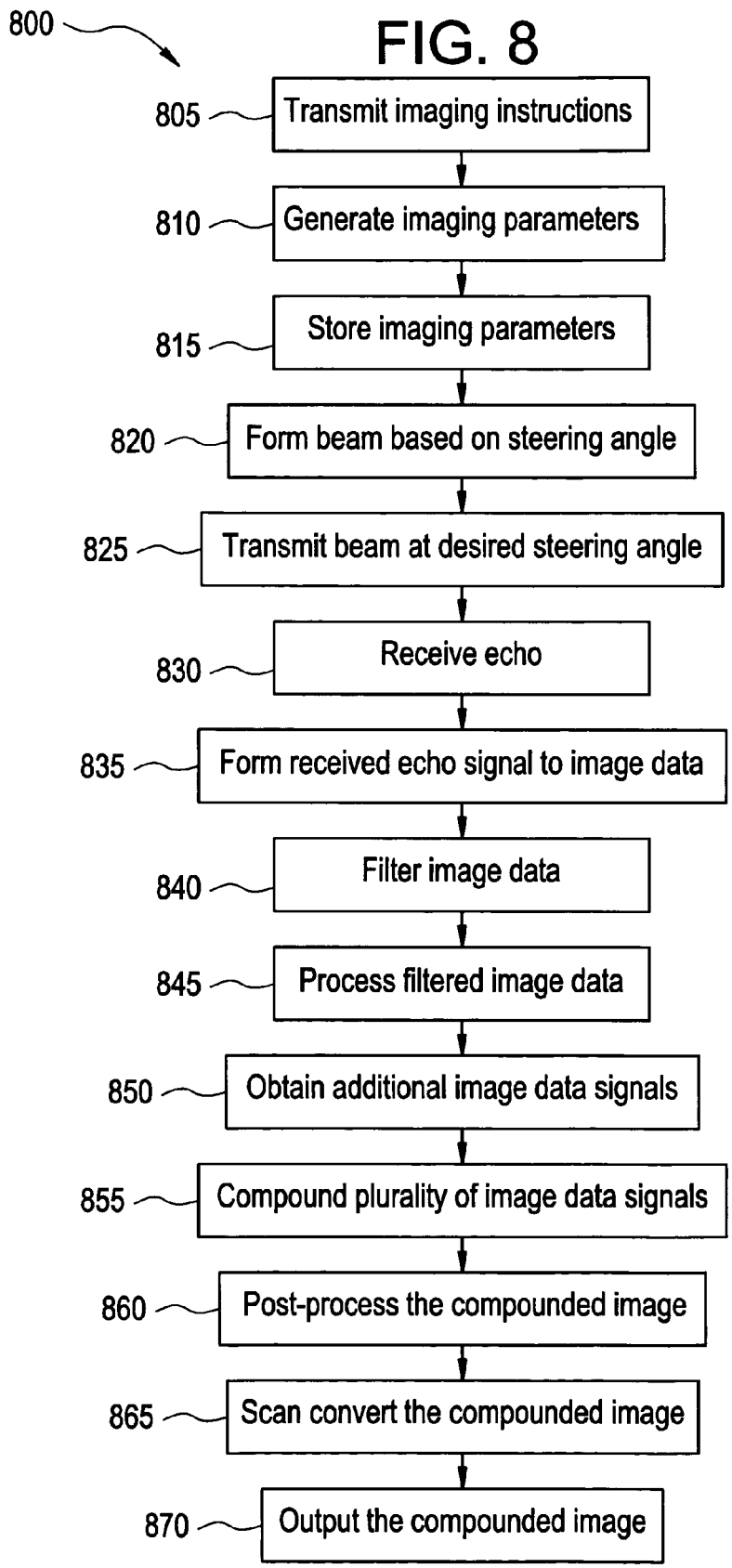

METHOD AND APPARATUS FOR ULTRASOUND COMPOUND IMAGING WITH COMBINED FUNDAMENTAL AND HARMONIC SIGNALS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to ultrasound imaging. In particular, the present invention relates to ultrasound compound imaging with combined fundamental and harmonic signals.

Ultrasound is sound having a frequency that is higher than a normal person may hear. Ultrasound imaging utilizes ultrasound waves or vibrations in the frequency spectrum above normal human hearing, such as the 2.5-10 MHz range. Ultrasound imaging systems transmit ultrasound into a subject, such as a patient, in short bursts. Echoes are reflected back to the system from the subject. Diagnostic images may be produced from the echoes. Ultrasound imaging techniques are similar to those used in sonar and radar.

A medical ultrasound system forms an image by sequentially acquiring echo signals from ultrasound beams transmitted to an object being imaged. An individual beam is formed by transmitting a focused pulse and receiving the echoes over a continuous range of depths. An amplitude of an echo signal decreases significantly for signal reflectors located deeper in the object due to increased signal attenuation of intervening structures, such as intervening tissue layers. Therefore, a signal-to-noise ratio decreases since noise generated by the ultrasound system's signal amplifiers, for example, may not be reduced to arbitrary low levels.

Forming the best possible image at all times for different anatomies and patient types is important to diagnostic imaging systems. Poor image quality may prevent reliable analysis of the image. For example, a decrease in image contrast quality may yield an unreliable image that is not usable clinically. Additionally, the advent of real-time imaging systems has increased the importance of generating clear, high quality images.

Spatial compounding has become an advanced and important diagnostic tool in a wide range of applications in ultrasound imaging. In spatial compounding, a target is scanned from several angles of insonification or irradiation with sound or other such waves. Multiple received images are then combined or averaged to form a single image. A compounded image typically shows less speckle or interference introduced by scattering which degrades image resolution. A compounded image may also provide better specular reflector delineation than conventional ultrasound images from a single angle. In some ultrasound machines, multi-angle spatial compounding has been implemented on different types of transducers, such as a one-dimensional linear array and a one-dimensional curved linear array.

In current systems producing multi-angle spatial compounding, grating lobes introduce artifacts in a resulting image. Grating lobes are side lobes or secondary ultrasound beams transmitted at angles to a main beam or main lobe. Echoes generated by grating lobe reflections may introduce artifacts in a resulting image.

To maintain a large field of view, multi-angle spatial compounding is currently implemented on non-sector-scan phased-array probes. Non-sector-scan phased-array probes are currently not designed to be steered with big angles as a sector scan phased-array probe. A non-sector-scan phased-array probe has a greater pitch value, such as $1\lambda$-$2\lambda$, compared to less than $0.5\lambda$ for a sector scan phased-array probe, where $\lambda$ is a wavelength of a probe center frequency. A first order grating lobe appears at an angle determined by a pitch and a wavelength as follows:

$$GL\_ang = 180 * a\sin(\sin\theta \pm \lambda/\text{pitch})/pi, /\sin\theta \pm \lambda/\text{pitch}/ < 1 \text{ (in degrees)} \quad (1),$$

where $\theta$ is the beam steering angle.

The first order grating lobe appears at an angle between 30 and 90 degrees with pitch at about $1\lambda$-$2\lambda$, for example. For example, a probe with pitch=$1.5\lambda$ has a first order grating lobe angle, GL_ang, of 42 degrees with a grating lobe amplitude 35 dB down from a main lobe when $\theta=0$. When a beam is steered with an angle $\theta \neq 0$, the amplitude of the grating lobe increases as a steering angle increases. For example, for a steered angle at 30 degrees, the amplitude of the grating lobe increases up to 6 dB down from the main lobe.

Additionally, the grating lobe typically has worse resolution than the main lobe, which results in feather-like artifacts in an image. FIG. 1 shows a main lobe at a 30-degree steering angle with a grating lobe shown at a −9-degree angle that has an amplitude 6 dB down from the main lobe. For some transmit vectors, a grating lobe at one side is included in a field of view, as shown in FIG. 1. The grating lobe generates artifacts, especially when the grating lobe is approximately orthogonal to a specular reflector surface. Artifacts degrade image quality of a spatial compounding image. Artifacts also interfere with a clinician's ability to distinguish tumors and lesions, for example, from normal tissue. Thus, there is a need for a system and method for improved spatial compounding. A system and method that reduce artifacts, such as grating lobes, in a compound ultrasound image would be highly desirable.

One method used to reduce artifacts uses a lower frequency for a bigger steered angle to avoid grating lobes in a field of view as disclosed in "Multi-angle spatial compounding", Soren K. Jesperen, et. al., Ultrasonic Imaging 20, pp. 81-102, 1998. However, while a lower frequency may improve grating lobe suppression, a lower frequency degrades axial resolution with frequency compounding. Alternatively, a smaller steering angle may be used to reduce a grating lobe level. However, a smaller steering angle suffers from compounding effects, such as speckle suppression and line definition, since less benefit is acquired with a smaller steering angle. Therefore, an improved method and apparatus for reducing or eliminating grating lobes would be highly desirable.

BRIEF SUMMARY OF THE INVENTION

Certain embodiments of the present invention provide a method and system for improved compounding imaging in an ultrasound system. Certain embodiments of the method include selecting a first ultrasound imaging mode based on a first steering angle and transmitting a first ultrasound signal at the first steering angle. The method includes receiving a first echo signal based on the first ultrasound signal. Then, the method includes selecting a second ultrasound imaging mode based on a second steering angle and transmitting a second ultrasound signal at the second steering angle. The method next includes receiving a second echo signal based on the second ultrasound signal. The method includes compounding the first echo signal and the second echo signal to form a compound ultrasound image.

The method may also include generating ultrasound signal parameters for the first ultrasound signal and the second ultrasound signal based on the first and second steering angles. The method may further include storing information related to the first and second ultrasound signals in a memory based on the first and second steering angles. Additionally, the method may include beamforming the first ultrasound signal and the second ultrasound signal for transmission based on the first steering angle and the second steering angle. The method may include controlling an imaging mode based on at least one of the first and second steering angles. The method may also include receiving a plurality of echo signals based on at least one of the first and second ultrasound signals. Certain embodiments may apply to multiple steering angles and multiple imaging modes.

Certain embodiments of the system include an angle dependent imaging mode controller for selecting an imaging mode based on a steering angle. The system also includes an imaging parameter generator for generating parameters for a beam based on the steering angle. The system additionally includes a beamformer for forming a beam based on the parameters and the steering angle. The system further includes a transducer for transmitting the beam at the steering angle and receiving an echo signal in response to the beam. Additionally, the system includes a compounder for compounding a plurality of beams at a plurality of steering angles from a plurality of imaging modes into a compound image.

In an embodiment, the system may also include a memory for storing the parameters. The beamformer may include a transmit beamformer and a receive beamformer. The system may also include a filter for filtering the echo signal. Additionally, the system may include a processor for processing the echo signal. In an embodiment, the transducer receives a plurality of echo signals in response to a transmitted beam. The imaging mode may include harmonic, fundamental, coded, and/or variable frequency imaging.

Certain embodiments include a method for improved compound imaging using a plurality of imaging modes. The method includes receiving a plurality of echo signals in response to a plurality of beams formed based on a plurality of imaging modes and a plurality of steering angles and compounding the plurality of echo signals to form a compound image. In an embodiment, the imaging modes include at least one of harmonic, fundamental, coded harmonics and variable frequency imaging. In an embodiment, the steering angles include at least one of a non-steering or zero angle, a positive angle, and a negative angle. The method may also include generating parameters for the plurality of beams formed based on an imaging mode and a steering angle. Additionally, the method may include storing the parameters. In an embodiment, the plurality of echo signals is filtered. The method may also include controlling the imaging mode based on the steering angle.

BRIEF DESCRIPTION OF SEVERAL VIEWS OF THE DRAWINGS

FIG. 3 illustrates a method for ultrasound imaging in accordance with an embodiment of the present invention.

FIG. 4 depicts multi-angle spatial compounding with combined fundamental and harmonic signals used in accordance with an embodiment of the present invention.

FIG. 5 illustrates three exemplary compound imaging implementation strategies used in accordance with an embodiment of the present invention.

FIG. 6 shows additional compound imaging schemes used in accordance with an embodiment of the present invention.

FIG. 8 illustrates a flow diagram for a method for improved compound imaging used in accordance with an embodiment of the present invention.

Figure 1:
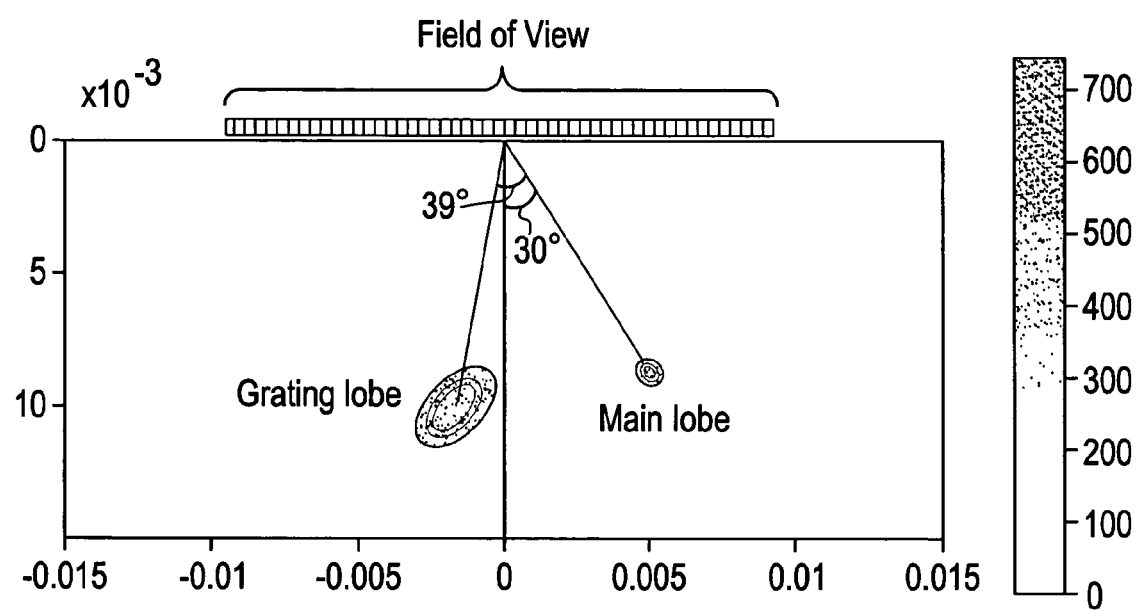
FIG. 1 shows a main lobe at a 30-degree steering angle with a grating lobe shown at a −9-degree angle that has an amplitude 6 dB down from the main lobe.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 2:
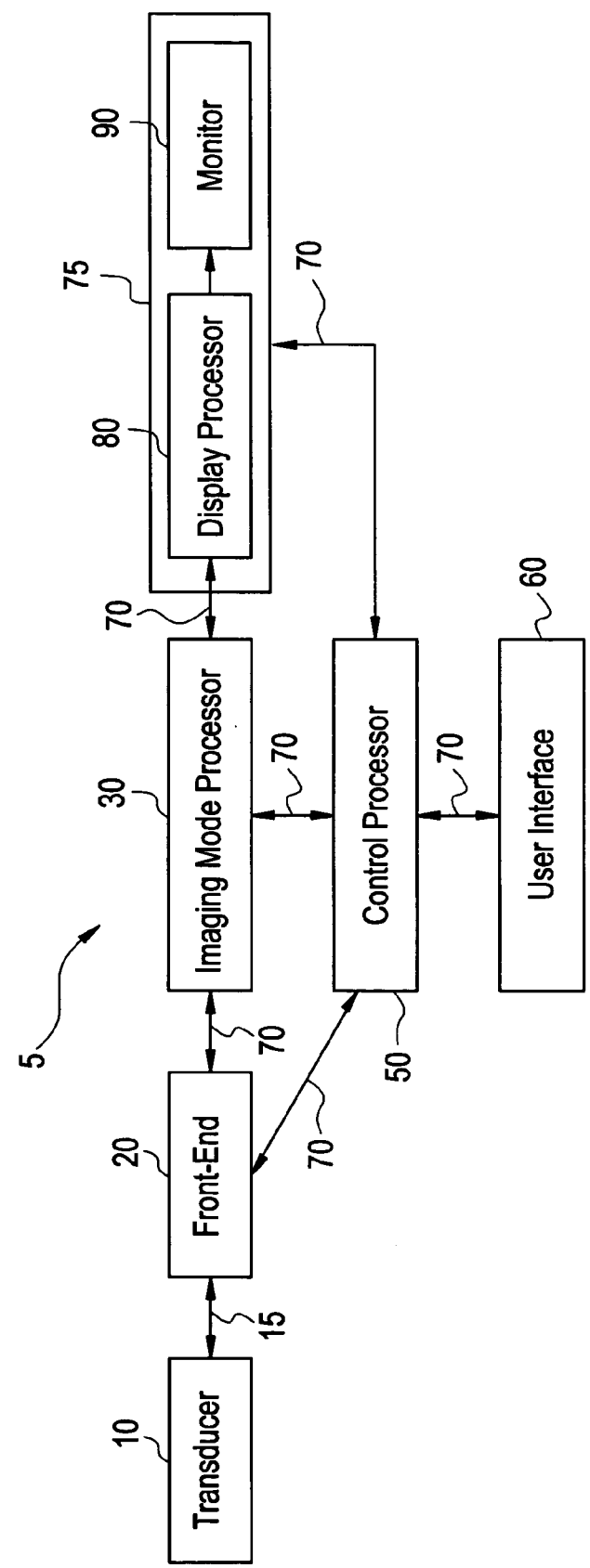
FIG. 2 illustrates a block diagram of an ultrasound imaging system used in accordance with an embodiment of the present invention.

FIG. 2 illustrates a block diagram of an ultrasound imaging system 5 used in accordance with an embodiment of the present invention. The system 5 includes a transducer 10, a front-end 20, an imaging mode processor 30, a user interface 60, a control processor 50, and a display 75. The imaging mode processor 30 and the control processor 50 may be part of a back-end system. The transducer 10 is used to transmit ultrasound waves into a subject by converting electrical analog signals to ultrasonic energy. The transducer 10 also is used to receive ultrasound waves that are backscattered from the subject by converting ultrasonic energy to analog electrical signals. The front-end 20 including a receiver, a transmitter, and a beamformer, is used to create transmitted waveforms, beam patterns, receiver filtering techniques, and demodulation schemes that are used for various imaging modes. The front-end 20 converts digital data to analog data and vice versa. The front-end 20 interfaces with the transducer 10 via an analog interface 15. The front-end 20 interfaces with the imaging mode processor 30 and the control processor 50 via a digital bus 70. The digital bus 70 may include several digital sub-buses. The digital sub-bases may have separate configurations and provide digital data interfaces to various parts of the ultrasound imaging system 5.

The imaging mode processor 30 provides amplitude detection and data compression for an imaging mode, such as B-mode imaging, M-mode imaging, BM-mode imaging, harmonic imaging, Doppler imaging, color flow imaging, and/or any other ultrasound imaging mode. The imaging mode processor 30 receives digital signal data from the front-end 20. The imaging mode processor 30 processes the received digital signal data to produce estimated parameter values. The estimated parameter values may be produced using the received digital signal data. The digital signal data may be analyzed in frequency bands centered at the fundamental, harmonics, or sub-harmonics of the transmitted signals to produce the estimated parameter values. The imaging mode processor 30 passes the estimated parameter values to a control processor 50 over the digital bus 70. The imaging mode processor 30 may also pass the estimated parameter values to the display 75 via the digital bus 70.

The display 75 includes a display processor 80 and a monitor 90. The display processor 80 accepts digital parameter values from the imaging mode processor 30 and the control processor 50. The display processor 80 may perform scan-conversion functions, color mapping functions, and tissue/flow arbitration functions, for example. The display processor 80 processes, maps, and formats the digital data for display, converts the digital display data to analog display signals, and passes the analog display signals to the monitor 90. The monitor 90 accepts the analog display signals from the display processor 80 and displays the resultant image. An operator may view the image on the monitor 90.

The user interface 60 allows user commands to be input by the operator to the ultrasound imaging system 5 through the control processor 50. The user interface 60 may include a keyboard, mouse, switches, knobs, buttons, track ball, and/or on screen menus, for example.

The control processor 50 is the central processor of the ultrasound imaging system 5. The control processor 50 interfaces to other components of the ultrasound imaging system 5 using the digital bus 70. The control processor 50 executes various data algorithms and functions for various imaging and diagnostic modes. Digital data and commands may be transmitted and received between the control processor 50 and other components of the ultrasound imaging system 5. In an alternative embodiment, functions performed by the control processor 50 may be performed by multiple processors and/or may be integrated into the imaging mode processor 30 and/or the display processor 80. In another embodiment, the functions of the processors 30, 50, and 80 may be integrated into a single personal computer (PC) backend.

FIG. 3 illustrates a method 300 for ultrasound imaging in accordance with an embodiment of the present invention. First, at step 310, the transducer 10 transmits ultrasound energy into a subject, such as a patient. Then, at step 320, ultrasound energy or echoes backscattered from the subject are received at the transducer 10. Signals are received at the front-end 20 in response to ultrasound waves backscattered from the subject.

Next, at step 330, the received signals are transmitted from the front-end 20 to the imaging mode processor 30 using the digital bus 70. At step 340, the imaging mode processor 30 generates parameter values based on the received signals. Then, at step 350, the parameter values are sent to the control processor 50.

At step 360, the control processor 50 processes the parameter values for use in display, storage, and diagnostics at the display 75. The control processor 50 processes the image data parameter values to reduce artifacts and process resulting image(s). The control processor 50 and/or imaging mode processor 30 may compound image data to produce a compound image. For example, image data from a plurality of angles may be combined or averaged to produce a spatially compound image.

Next, at step 370, processed parameter values are transmitted to the display 75. The display processor 80 may also process parameter values from a plurality of focal zone images to produce a combined image in conjunction with and/or in addition to the control processor 50.

Finally, at step 380, a diagnostic image is produced and output at the monitor 90. The image may be stored, displayed, printed, and/or further transmitted, for example. The display processor 80 may produce the diagnostic image using the processed parameter values from the digital signal data.

For implementation of spatial compound imaging, some ultrasound imaging systems use full fundamental or full harmonic transmission in all directions. Received echo signal data is then combined to form an image. Using a single transmit fundamental frequency may result in severe grating lobe artifacts. Decreasing transmit signal frequency as transmission angle decreases may help reduce the grating lobes. However, decreasing transmitting signal frequency results in degradation of signal resolution. On the other hand, harmonic transmissions have fewer grating lobes than fundamental frequencies. However, harmonic transmission provides less penetration than fundamental frequency transmission.

In an embodiment, fundamental and harmonic frequency transmissions are combined to produce a resulting image. For small steering angles with little or no grating lobes, fundamental frequencies may be transmitted. For large steering angles, more grating lobes are produced, so harmonic frequencies may be transmitted. Fundamental and harmonic echo signals may be processed and combined to produce one or more images. By combining fundamental and harmonic signals where appropriate based on beam steering angle, speckle may also be smoothed more effectively. Low or high frequency fundamental transmissions, as well as single, double or coded harmonics as disclosed in U.S. patent application "Method and Apparatus for Tissue Harmonic Imaging with Natural (Tissue) Decoded Coded Excitation", Ser. No. 10/679,542 filed on Oct. 7, 2003, by Xiaohui Hao et. al., for example, may also be used and combined with other fundamental and/or harmonic signals. The imaging mode processor 30 or other hardware or software determines which kind of signals to fire from the transducer 10 into an object to be imaged.

Certain embodiments provide a compound imaging technique that maintains spatial resolution while reducing grating lobes. Frequencies are lowered for angle steering, and harmonic imaging is used when the steering angle is greater than 0, for example. In an embodiment, frequency compounding (or variable frequency imaging) as disclosed in patent application "Method and Apparatus for Ultrasonic Speckle Reduction Using Wideband Frequency Compounding with Tissue-Generated Harmonics", by application Ser. No. 10/335,277, filed on Dec. 31, 2002, by Feng Lin et. al., is combined with multi-angle spatial compounding to help improve speckle suppression.

Compared to fundamental imaging, harmonic imaging has lower grating lobe magnitude because a second harmonic amplitude depends on a square of a fundamental amplitude. A grating lobe signal with a lower amplitude than a main lobe throughout a pulse-echo transmission path generates lower harmonic signals. Lower harmonic signals result in effective grating lobe suppression in harmonic imaging. Grating lobe magnitude reduction may be more significant than using a lower frequency. For example, at least a 50% reduction (log scale, for example) in artifacts from grating lobe effects may be achieved using grating lobe magnitude reduction.

Compared to fundamental imaging, harmonic imaging has improved spatial resolution. For example, lateral resolution may be $1/\sqrt{n}$, where n is an order of harmonic imaging (n=2, for example), which results in tighter speckle and improved contrast resolution. Tighter speckle and improved contrast resolution may help improve contrast and spatial resolution in a multi-angle compound image. Additionally, since harmonic imaging has a different type of speckle compared to fundamental imaging, spatial compounding between fundamental imaging and harmonic imaging may help to improve speckle reduction. Furthermore, compared to spatial compounding of harmonic imaging, transmitting and receiving at a fundamental frequency at a zero degree or small angle may help to maintain ultrasound signal penetration, dynamic range, and frame rate.

FIG. 4 depicts multi-angle spatial compounding with combined fundamental and harmonic signals used in accordance with an embodiment of the present invention. In FIG. 4, transmission is separated into different imaging modes according to transmission angle. For example, a zero degree transmission corresponds to one imaging mode, a transmission with absolute steering angle $\alpha°$ corresponds to another imaging mode, and a transmission with absolute steering angle $\beta°$ corresponds to another imaging mode, etc. An imaging mode may be fundamental imaging, harmonic imaging, coded harmonic imaging, or frequency compound imaging at various frequencies, for example.

FIG. 5 illustrates three exemplary compound imaging implementation strategies used in accordance with an embodiment of the present invention. For example, as shown in the first column of FIG. 5, high frequency fundamental imaging is applied in zero degree steering angle imaging with transmit and receive signals at a high frequency. Then, harmonic imaging is applied when a steering angle is greater than zero degrees. The harmonic imaging may use single-firing/band pass filtering technology, double-firing phase inversion harmonic technology, wideband technology, or a combination of fundamental, phase inversion harmonic, single firing harmonic, and/or wideband, for example. A choice of harmonic imaging may depend on a trade off between spatial resolution and frame rate, for example. In an embodiment, phase inversion harmonic imaging may have better axial spatial resolution than single firing/band pass harmonic imaging while the frame rate is decreased to half. Thus, single firing harmonic imaging may be applied in large steering angle situations to maintain high frame rate.

For increased resolution, higher SNR, and/or better signal penetration, harmonic imaging may be replaced with coded harmonic imaging. Coded harmonic imaging is described in U.S. patent application "Method and Apparatus for Tissue Harmonic Imaging with Natural (Tissue) Decoded Coded Excitation", Ser. No. 10/679,542, filed on Oct. 7, 2003, by Xiaohui Hao et. al. The patent application is incorporated herein by reference.

In another embodiment, a lower frequency is used in a small steering angle, and harmonic imaging is employed with a large steering angle, as shown in the right column of FIG. 5. Harmonic imaging includes single firing/band pass filtering, phase inversion, and coded harmonic imaging, for example. A combination of high fundamental frequency with zero steering angle, lower fundamental frequency with a small steering angle, and harmonic imaging with a large steering angle may be used. A combination may result in grading lobe reduction and improved speckle reduction and signal penetration through use of frequency compounding, different image mode compounding, and/or spatial compounding, for example.

FIG. 6 shows additional compound imaging schemes used in accordance with an embodiment of the present invention. The first column of FIG. 6 shows spatial compounding combined with a frequency compounding technology developed by Feng Lin in "Method and Apparatus for Ultrasonic Speckle Reduction Using Wideband Frequency Compounding with Tissue-Generated Harmonics", application Ser. No. 10/335,277, filed on Dec. 31, 2002, by Feng Lin et. al. A fundamental frequency at a lower band of transducer probe 10 response is combined with a harmonic frequency at a higher band of probe 10 response through three firings, for example. At each steering angle, three firing frequency compounding is applied. Since lower fundamental frequency is employed, grating lobe amplitude may be acceptable. Additionally, speckle may be smoother compared with regular spatial compounding due to a multi-compounding effect.

The second column of FIG. 6 illustrates another method to further improve a speckle reduction effect. In an embodiment, fundamental imaging and harmonic imaging are alternatively applied for different steering angles. For example, high frequency fundamental imaging may be applied at a zero degree angle. Harmonic imaging may be applied at a steering angle of $\alpha°$. Lower frequency fundamental imaging may be applied at a steering angle $\beta°$ which follows steering angle $\alpha°$. Then, for a steering angle that follows $\beta°$, harmonic imaging is employed again. The above-described alternating imaging may continue until imaging at a highest desired steering angle has been completed, as shown in FIG. 6.

Figure 7:
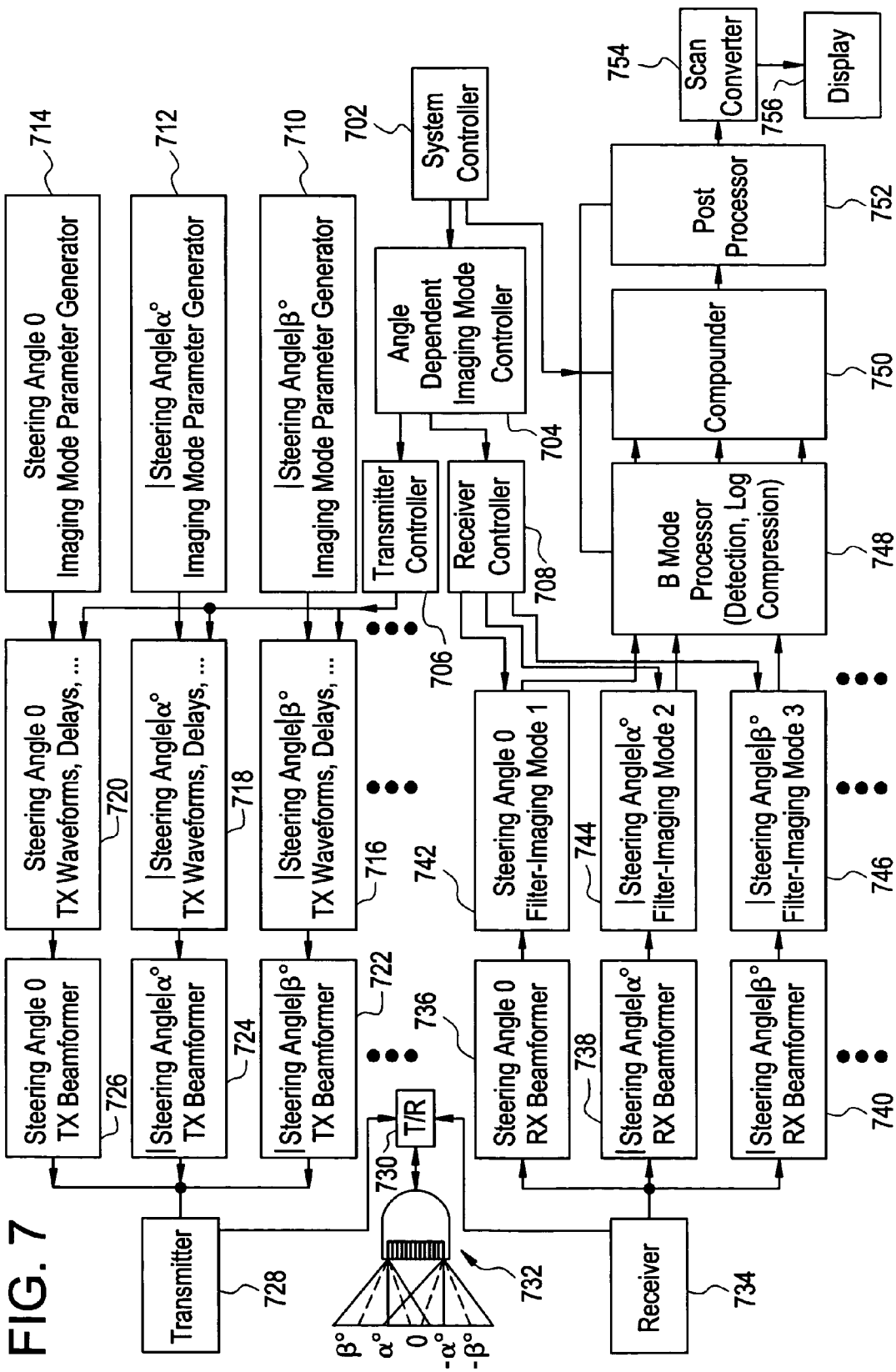
FIG. 7 illustrates an image compounding system used in accordance with an embodiment of the present invention.

FIG. 7 illustrates an image compounding system 700 used in accordance with an embodiment of the present invention. The system 700 may be used for multi-mode/multi-angle spatial compounding, for example. In an embodiment, the system 700 is incorporated into the system 5, such as into the front-end 20, transducer 10, imaging mode processor 30, and/or control processor 50 of the system 5.

For different imaging modes, different transmit beamforming, receive beamforming, and receive filtering may be employed. For each pair of transmit steering angles (for example, angle 0, angle $\alpha°$, angle $\beta°$, etc), corresponding waveforms are generated in the imaging mode parameter generators 710, 712, 714. Corresponding waveforms are shaded according to steering angle. Delays are also associated with the waveforms. Parameters, such as waveforms, shading, and delays are saved in memory 716, 718, 720. Parameters are sent to a transmit beamformer 722, 724, 726. The transmit beamformer 722, 724, 726 sends the beamformed signals to the transmitter 728 for transmission via the transmit/receive switch 730 and transducer 732. The transmit/receive switch 730 communicates with the transducer 732 and enables the transducer or probe 732 to switch between transmit and receive modes. The signal is transmitted based on steering angle and delay, for example. An angle dependent imaging mode controller 704 adjusts transmit imaging parameters according to steering angle. The angle dependent imaging mode controller 704 controls selection of transmit mode parameter generators 710, 712, 714, memory 716, 718, 720 and transmit beamformers 722, 724, 726 using a transmit controller 706. The angle dependent imaging mode controller 704 determines whether harmonic, fundamental, coded harmonics, or other imaging is performed.

For receiving, different receive beamformers 736, 738, 740 and filters 742, 744, 746 are employed for different imaging modes used in each pair of steering angles (including non-steering and 0 degree angles, for example). The angle dependent imaging mode controller 704 controls selection of receive beamformers 736, 738, 740 and filters 742, 744, 746 using a receive controller 708. After filtering and demodulation, imaging data from each of pair of steering angles (including a 0 degree angle, for example) is envelope detected. Next, the imaging data is log compressed and processed in the processor 748. The processing may include edge enhance, low pass filtering, down sampling and so on. Then, the imaging data is compounded using the compounder 750. Image data from various imaging modes are first placed in right positions, for example, according to registration information such as steering angles. Then, data from different angles is combined using a method such as cubic interpolation to generate compounded image. After compounding, image data may be post-processed in the post-processor 752. Post-processing may include tissue characterization, automatic vessel wall segmentation, etc. The post-processed compounded data is scan converted in the scan converter 754 and transmitted to an output 756 for display, storage, and/or other transmission. Operations are controlled by a system controller 702. In an embodiment, multi-line acquisition (for example, transmit one vector and receive two vectors, transmit one vector and receive four vectors) or multi-line transmission may be employed in the front end 20 and transducer 10 to improve frame rate.

In operation, for example, a user or computer program transmits a command or signal to the system controller 702 to initiate ultrasound imaging. The system controller 702 communicates with the angle dependent imaging mode controller 704 to trigger the transmitter controller 706. The transmitter controller 706 selects an appropriate imaging mode parameter generator 710, 712, 714 depending on steering angle of a particular beam being transmitted. After imaging mode parameters, such as beam delay and waveform, have been generated, the parameters are stored in an appropriate memory 716, 718, 720. The transmit beamformer 722, 724, 726 retrieves the waveform and other parameters from the memory 716, 718, 720 and forms an ultrasound beam. The beam is routed through the transmitter 728 to the transmit/receive unit 730. The transmit/receive unit 730 transmits the ultrasound beam through the transducer probe 732.

The transmitted ultrasound beam penetrates tissue in a patient, for example. Echo signals are produced when the beam reflects off structures within the patient. The transducer 732 and the transmit/receive unit 730 receive the echo signals. The received echoes are routed to the receive beamformer 736, 738, 740 through the receiver 734. The appropriate receive beamformer 736, 738, 740 extracts signal data from the received echo signal(s). The received signal data is then filtered by the filter 742, 744, 746 depending upon the steering angle. The image mode processor 748 compresses and processes the signal data for transmission to the compounder 750. The compounder 750 compounds received signal data from a plurality of transmit signals and modes to form a compound image. Then, the compound image is post-processed to further remove artifacts, fine-tune the image, or other signal processing, for example, automatic vessel wall segmentation in the post-processor 752. The scan converter 754 prepares the compound image data for output at the display 756 or other storage. The scan converter 754 provides scan conversion functions, color mapping functions, tissue/flow arbitration functions, formatting functions, and/or other display functions, for example. The angle dependent imaging mode controller 704 controls selection of receive beamformer 736, 738, 740, filter 742, 744, 746, and processing using the receiver controller 708. The system controller 702 may transmit feedback or commands to the angle dependent imaging mode controller 704.

FIG. 8 illustrates a flow diagram for a method 800 for improved compound imaging used in accordance with an embodiment of the present invention. First, at step 805, instructions for imaging are transmitted. An imaging mode (for example, fundamental, harmonic, low frequency fundamental, or coded harmonics) may be transmitted with the instructions for ultrasound imaging. Then, at step 810, imaging parameters, such as waveform and delay, are generated for the imaging mode based on a steering angle, such as 0, $\alpha°$, or $\beta°$. At step 815, the imaging parameters are stored. Then, at step 820, a transmit beam is formed based on the steering angle for the beam. Next, at step 825, the beam is transmitted at the desired steering angle, such as 0, $\alpha°$, or $\beta°$. The beam is transmitted into an object, and internal structures in the object reflect or backscatter echoes based on the beam and steering angle.

Then, at step 830, an echo is received based on the transmitted beam. At step 835, the received echo is formed into an image data signal. Next, at step 840, the image data signal is filtered based on imaging mode and steering angle. Then, at step 845, the filtered image data is processed. For example, the image data may be compressed and artifacts may be detected in the image data. Next, at step 850, additional image data signals may be obtained from additional steering angles and imaging modes. In an embodiment, 5-9 different steering angles, for example, are used with multiple imaging modes to obtain image data. At step 855, image data signals from a plurality of steering angles and imaging modes are compounded into an image. Then, at step 860, the compound image is post-processed. For example, the compound image may be enhanced, zoomed, and/or artifact reduced. Next, at step 865, the compound image is scan converted. Finally, at step 870, the image is output. The image may be displayed, stored, and/or otherwise transmitted, for example.

Thus, certain embodiments of the present invention provide improved resolution in spatial compounding while minimizing grating lobe artifacts. Certain embodiments provide improved speckle suppression due to a combination of multi-mode and multi-angle spatial compounding. Additionally, certain embodiments provide a capability to implement spatial compounding in higher frequencies. Certain embodiments also provide improved image resolution and speckle reduction.

Certain embodiments employ multi-mode imaging for spatial compounding of image data to produce a compound image. In certain embodiments, use of harmonic frequencies with steering angles greater than zero improves image quality by reducing grating lobe artifacts that limit compounding frequency and degraded image quality. Use of harmonic frequencies with steering angles greater than zero may also maintain or improve spatial resolution. In certain embodiments, use of fundamental frequencies for non-steered angle (angle=0) maintains or improves signal penetration, dynamic range, and signal-to-noise ratio. Additionally, compounding of multi-mode images provides improved speckle resolution.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for improved compound ultrasound imaging, said method comprising:
selecting a plurality of ultrasound imaging modes based on a plurality of non-zero steering angles, wherein a first ultrasound imaging mode is selected based on a first non-zero steering angle and a second ultrasound imaging mode is selected based on a second non-zero steering angle, wherein said second non-zero steering angle comprises a larger steering angle than said first non-zero steering angle producing more grating lobes and wherein said first non-zero steering angle comprises a smaller steering angle than said second non-zero steering angle producing few grating lobes;
transmitting a plurality of ultrasound signals corresponding to said plurality of imaging modes at said plurality of non-zero steering angles, wherein said first ultrasound imaging mode is used to transmit at said first non-zero steering angle and said second ultrasound imaging mode is used to transmit at said second non-zero steering angle;
receiving a plurality of echo signals based on said plurality of ultrasound signals; and
spatially compounding said echo signals based on said plurality of ultrasound imaging modes and said plurality of non-zero steering angles to form a spatially compound ultrasound image.

2. The method of claim 1, wherein said plurality of imaging modes comprises at least one of harmonic, fundamental, coded harmonic, and variable frequency imaging.

3. The method of claim 1, further comprising generating ultrasound signal parameters for said plurality of ultrasound signals based on said plurality of non-zero steering angles.

4. The method of claim 1, further comprising storing information related to said plurality of ultrasound signals in a memory based on said plurality of non-zero steering angles.

5. The method of claim 1, further comprising beamforming said plurality of ultrasound signals for transmission based on said plurality of non-zero steering angles.

6. The method of claim 1, further comprising controlling an imaging mode based on at least one of said plurality of non-zero steering angles.

7. The method of claim 1, further comprising receiving a plurality of echo signals based on at least one of said plurality of ultrasound signals.

8. The method of claim 1, wherein said first ultrasound imaging mode comprises a fundamental frequency ultrasound mode and said second ultrasound imaging mode comprises a harmonic imaging ultrasound mode, wherein said first ultrasound imaging mode corresponds to a first non-zero steering angle and said second ultrasound imaging mode corresponds to a second non-zero steering angle and said second non-zero steering angle is greater than said first non-zero steering angle.

9. The method of claim 8, further including a third ultrasound imaging mode comprising a fundamental frequency ultrasound mode corresponding to a zero degree steering angle, wherein the frequency of said third ultrasound imaging mode is greater than the frequency of said first ultrasound imaging mode.

10. A method for improved compound imaging using a plurality of imaging modes, said method comprising:
receiving a plurality of echo signals in response to a plurality of beams formed based on a plurality of imaging modes corresponding to a plurality of non-zero steering angles, wherein a first ultrasound imaging mode is selected based on a first non-zero steering angle and a second ultrasound imaging mode is selected based on a second non-zero steering angle, wherein said first ultrasound imaging mode is used to transmit at said first non-zero steering angle and said second ultrasound imaging mode is used to transmit at said second non-zero steering angle, wherein said second non-zero steering angle comprises a larger steering angle than said first non-zero steering angle producing more grating lobes and wherein said first non-zero steering angle comprises a smaller steering angle than said second non-zero steering angle producing few grating lobes;
compounding said plurality of echo signals based on said plurality of ultrasound imaging modes and said plurality of non-zero steering angles to form a spatially compound image.

11. The method of claim 10, wherein said plurality of imaging modes comprises at least one of harmonic, fundamental, coded harmonic, and variable frequency imaging.

12. The method of claim 10, wherein said plurality of non-zero steering angles comprises at least one of a non-steering angle, a positive angle, and a negative angle.

13. The method of claim 10, further comprising generating parameters for said plurality of beams formed based on said plurality of imaging modes and steering angles.

14. The method of claim 13, further comprising storing said parameters.

15. The method of claim 10, further comprising filtering said plurality of echo signals.

16. The method of claim 10, further comprising controlling said imaging modes based on said non-zero steering angles.

17. A system for improved compound imaging, said system comprising:
an angle dependent imaging mode controller for selecting a plurality of imaging modes based on a plurality of non-zero steering angles, wherein a first ultrasound imaging mode is selected based on a first non-zero steering angle and a second ultrasound imaging mode is selected based on a second non-zero steering angle, wherein said second non-zero steering angle comprises a larger steering angle than said first non-zero steering angle producing more grating lobes and wherein said first non-zero steering angle comprises a smaller steering angle than said second non-zero steering angle producing few grating lobes;
an imaging parameter generator for generating parameters for a beam based on said plurality of non-zero steering angles;
a beamformer for forming a beam based on said parameters and said plurality of non-zero steering angles;
a transducer for transmitting said beam at said plurality of non-zero steering angles and receiving an echo signal in response to said beam, wherein said first ultrasound imaging mode is used to transmit at said first non-zero steering angle and said second ultrasound imaging mode is used to transmit at said second non-zero steering angle; and a compounder for spatially compounding a plurality of beams at a plurality of steering angles from a plurality of imaging modes into a spatially compound image.

18. The system of claim 17, further comprising a memory for storing said parameters.

19. The system of claim 17, wherein said beamformer comprises a transmit beamformer and a receive beamformer.

20. The system of claim 17, further comprising a filter for filtering said echo signal.

21. The system of claim 17, further comprising a processor for processing said echo signal.

22. The system of claim 17, wherein said transducer receives a plurality of echo signals in response to a beam.

23. The system of claim 17, wherein said imaging modes comprise at least one of harmonic, fundamental, coded harmonic, and variable frequency imaging.

* * * * *